United States Patent [19]

Yamamoto et al.

[11] Patent Number: 4,898,738

[45] Date of Patent: Feb. 6, 1990

[54] PROCESS FOR PRODUCING VINEGAR FROM NON-COOKED ALCOHOL MOROMI

[75] Inventors: Takehiko Yamamoto, Izumi; Terumasa Kubota, Toyohashi; Isao Itoh, Kashihara; Hiroyuki Kato, Isoki; Terumi Kikuchi, Toride; Hiroko Kawasaki; Misako Mashimoto, both of Sakai; Yuji Oki, Higashi-Osaka, all of Japan

[73] Assignee: Tamanoi Vinegar Corporation Limited, Osaka, Japan

[21] Appl. No.: 348,085

[22] Filed: May 4, 1989

Related U.S. Application Data

[63] Continuation of Ser. No. 111,798, Oct. 22, 1987, abandoned.

[30] Foreign Application Priority Data

Dec. 22, 1986 [JP] Japan .................................. 61-305858

[51] Int. Cl.$^4$ .............................. C12J 1/00; C12J 1/04
[52] U.S. Cl. ........................................ 426/17; 426/495
[58] Field of Search ...................... 426/17, 7, 592, 495

[56] References Cited

U.S. PATENT DOCUMENTS

4,092,434  5/1978  Yoshizumi et al. .................... 426/13

FOREIGN PATENT DOCUMENTS

0149375  8/1985  Japan ..................................... 426/17
1119183  6/1986  Japan ..................................... 426/17

*Primary Examiner*—Marianne Cintins
*Attorney, Agent, or Firm*—Wenderoth, Lind & Ponack

[57] ABSTRACT

The present invention provides a method of producing vinegar of stable quality with no musty odor by applying alcoholic fermentation to cereal not undergoing heat denaturation while controlling the amount of soluble nitrogen in alcohol MOROMI by adding an enzyme preparation composed of glucoamylase and yeast, subjecting it to solid/liquid separation and then conducting acetic acid fermentation directly the separated solution containing alcohol as the starting material.

3 Claims, No Drawings

PROCESS FOR PRODUCING VINEGAR FROM NON-COOKED ALCOHOL MOROMI

This application is a continuation of now abandoned application Ser. No. 07/111,798, filed on Oct. 22, 1987; now abandoned.

BACKGROUND OF THE INVENTION

1. Field of the Invention

The present invention concerns a process for producing vinegar from non-cooked alcohol MOROMI which comprises pulverizing cereal which has not undergone heat denaturation (that is, in a not-alpharized non-cooked state), subjecting the pulverized cereal to alcoholic fermentation by means of a non-cooking enzymatic step and then directly conducting acetic acid fermentation by means of acetic acid bacteria. Thus, the invention relates to the technical field for the production of vinegar.

2. Prior Art

There has been known a process for producing brewed vinegar through acetic acid fermentation by adding seed vinegar to liquors, alcohol, lees, lees extracts or mixtures thereof prepared from not-alpharized non-cooked cereal, taros or potatoes or other starch materials and malt (Koji) obtained by growing fungi thereon as the starting material or by adding seed vinegar to MOROMI obtained by conducting saccharification and alcoholic fermentation for such starting material at the same time (Japanese Patent Publication No. Sho 59-33352).

It has also been known in the above acetic acid fermentation successes to add fermentation aids, sub-starting materials, seasonings, seasoning liquids or alcohol (Japanese Patent Laid-Open No. Sho 58-31985). Further, there has also been known a method of producing vinegar by adding malt (Koji), enzyme and vinegar or acetic acid to non-cooked cereal or cereal processed products and subjecting the mixture to alcoholic fermentation and acetic acid fermentation (Japanese Patent Laid-Open No. Sho 61-11915).

Although, the conventional production method for brewed vinegar as described avove is execellent in view of heat economy and saving for the production step, apparatus, etc., the amount of soluble nitrogen in the vinegar is not stable but tends to be increased because of the use of malt (Koji) and fermentation at ambient temperature. Further, since lactic acid has been added in the conventional vinegar production process, it results in precursors for musty odors which, for example, worsen the stability and the quality of vinegar after acetic acid fermentation, and cause coloration, musty odor, heavy taste, etc. resulting in a low grade product.

SUMMARY OF THE INVENTION

The object of the present invention is to control the amount of soluble nitrogen that brings about instablility in the quality of the vinegar without decreasing the fermentation yield, as well as to obtain an alcoholic fermentation liquid with reduced lactic acid and glycerine content.

The foregoing object of the present invention can be attained by a process for producing vinegar, which comprises pulverizing non-cooked cereal, adding water from 2.0–7.0 times by volume and home cultured or commercially available yeast thereto, adding an enzymatic preparation such as a glucoamylase preparation containing from 8 to 15 units of glucoamylase activity and from 0 to 35 units of protease activity and a pectinasepreparation containing from 0.02 to 0.25 units of pectinase activity per 1 g of starch in the pulverized cereal, and after adjusting pH to 4.5, conducting alcoholic fermentation at 23° C.–35° C. for 2 to 6 days, then conducting acetic acid fermentation at 20°–35° C. affer solid-liquid separation for 1 to 3 days in a case of submerged fermentation and for 2 to 30 days in a case of surfaced fermentation, wherein said process is conducted in the absence of malt.

The acetic acid fermentation can be carried out under the conditions of aeration in an amount of from 0.04 to 0.20 liter of air/min/liter of MOROMI to provide an initial acid concentration of 2–8% and an initial alcohol concentration of 0.4–4%.

In the process according to the present invention, lactic acid and glycerine contents in the alcoholic fermentation MOROMI are low, which greatly contributes to the favorable taste of vinegar. Lactic acid and glycerine are generally metabolized by acetic acid bacteria to form acetoin and diacetyl which bring about musty odor thus worsening the quality of products. For instance, the amount of acetoin formed is shown in Table 1.

TABLE 1

|  | Rice | | Corn | |
| --- | --- | --- | --- | --- |
|  | Conventional method | Invented method | Conventional method | Invented method |
| Acetoin (ppm) | 137.1 | 28.8 | 73.1 | 1.47 |

The lactic acid and glycerine contents resulting from the treatment 100 g of pulverized cereal using the method according to the present invention and the alcoholic fermentation by the conventional method are impared in Table 2.

TABLE 2

| Alcohol fermentation process | Rice | | Corn | |
| --- | --- | --- | --- | --- |
|  | Lactic acid | Glycerine | Lactic acid | Glycerine |
| Enzyme addition process (present invention) | 0.003 g | 2.0 g | 0.015 g | 2.1 g |
| Conventional method | 0.41 g | 2.4 g | 0.10 g | 2.6 g |

*: 1% Uniase K and 190 g of water were used in the conventional method

It is supposed that the lactic acid and glycerine contents are reduced in MOROMI by the process according to the present invention, because the conditions employed for the process are not suitable for the propagation of lactic acid bacteria and also not suitable to the formation of glycerine by yeast. The result of sensory evaluation is shown in Table 3.

TABLE 3

| Starting material | Those preferring vinegar prepared by conventional process | Those preferring vinegar prepared by the invented process |
| --- | --- | --- |
| Rice | 3 | 27 |
| Corn | 2 | 28 |

Further, since the amount of soluble nitrogen is decreased using the invented process as compared with the conventional process, the degree of coloration is reduced. This is shown, for example, in Table 4.

TABLE 4

|  |  | Total nitrogen amount m/g 100 ml | Amino formed nitrogen mg/100 ml | Degree of coloration (OD430) |
|---|---|---|---|---|
| Invented process | Rice | 89.0 | 26.9 | 0.070 |
|  | Corn | 42.0 | 6.9 | 0.082 |
| Conventional process | Rice | 160 | 49.0 | 0.103 |
|  | Corn | 180 | 63.0 | 0.177 |

Commercially available glucoamylase preparation generally contains protease activity and the control of the protease activity as a rate determining factor is required for controlling the amount of soluble nitrogen.

There are various methods for controlling protease activity. Protease activity is deactivated completely, for example, by adding sodium carbonate to 1% enzymatic solution to adjust pH to 7.8 and incubating at 40° C. for 30 minutes. Further by varying pH, it is possible to obtain enzyme preparations of different deactivation rate for protease activity.

The properties of products according to the present invention under various conditions are further explained in Examples 1–8.

When conducting alcoholic fermentation under various conditions, the amount of the soluble nitrogen can be controlled without reducing the fermentation yield. For instance, this is shown as in Table 5 in the case of rice and corn.

TABLE 5

| | | (Alcohol MOROMI) | | | | | |
| | | Fermentation condition (Enzyme activity U/1 g starch) | | | | | Amount of soluble |
| Example | Starting material | Glucoamylase | Pectinase | Protease | Temperature (°C.) | Yield % | nitrogen mg/100 ml |
|---|---|---|---|---|---|---|---|
| 1 | Rice | 9 | 0.13 | 0 | 28 | 88 | 135 |
| 2 | Rice | 9 | 0.13 | 20 | 28 | 95 | 200 |
| 3 | Rice | 14 | 0.2 | 30 | 34 | 95 | 260 |
| 4 | Corn | 10 | 0.02 | 0 | 28 | 87 | 53 |
| 5 | Corn | 10 | 0.13 | 22 | 28 | 87 | 70 |
| 6 | Corn | 15 | 0.23 | 34 | 34 | 91 | 145 |
| *Conventional process | Rice | — | — | — | 20~25 | 82 | 160 |
|  | Corn | — | — | — | 20~25 | 79 | 180 |

*: 1% Uniase K and 190 of water were used in the conventional method

Further, the amount of soluble nitrogen can be controlled also by maintaining the fermentation temperature at 30°–35° C. from the start of fermentation to the end of the first day and at 25° C.–30° C. from the second day to the completion of the fermentation without reducing the yield of the fermentation. For instance, Table 6 shows the cases for rice and corn.

TABLE 6

|  |  | (Alcohol MOROMI) | | | |
|  |  | Fermentation temperature | | | Amount of |
| Example | Starting material | 1st day | after 2nd day | Yield (%) | soluble nitrogen (mg/100 ml) |
|---|---|---|---|---|---|
| 7 | Rice | 34 | 28 | 96 | 150 |
| 8 | Corn | 34 | 28 | 91 | 43 |

Then, the sensory evaluation was conducted as described below.

A sensory evaluation was conducted for vinegar produced as described in Examples 1–6 while using the vinegar produced by the conventional process as a control. The vinegar was evaluated by a ten member panel using the following scoring method: very good: 2, good: 1, ordinary: 0, poor: −1, very poor; −2. The results are shown in Tables 7 and 8.

TABLE 7

|  | (rice) (vinegar) | | | |
| Example | control | 1 | 2 | 3 |
|---|---|---|---|---|
| Total score | — | 18 | 9 | 1 |
| Average | —· | 1.8 | 0.9 | 0.1 |
| Range | — | 1 | 2 | 3 |
| Amount of soluble nitrogen (mg/100 ml) | 53 | 40 | 67 | 95 |

There was a meaningful difference with 1% of dangerous rate between Examples 1 and 3, and also a meaningful difference of 5% dangerous rate between Examples 1 and 2 and Examples 2 and 3 in the table above.

TABLE 8

|  | (corn) (vinegar) | | | |
| Example | control | 4 | 5 | 6 |
|---|---|---|---|---|
| Total score | — | 13 | 6 | 2 |
| Average | — | 1.3 | 0.6 | 0.2 |
| Range | — | 2 | 2 | 3 |
| Amount of soluble nitrogen (mg/100 ml) | 45 | 20 | 23 | 50 |

There was a meaningful difference of 1% dangerous rate between Examples 4 and 6.

It can be seen from Tables 7 and 8 that better results are shown with less amount of soluble nitrogen both for corn and rice from the point of view of taste. Further, upon examining the aging change, better results were similarly obtained with less amount of soluble ingredients as to degree of coloration, musty odor and heavy taste. The vinegar produced by the invented process was evaluated better in all of the cases as compared with vinegar by the conventional process.

Activity of glucoamylase, pectinase and protease were measured in accordance with the measuring method of Amano Seiyaku K.K., which is as described below.

(Glucoamylase Activity)

Enzyme acts on starch as the substrate, reducing sugar formed by the enzymatic action is heated together with a Fehling's solution to quantitatively precipitate cuprous oxide and excess copper is titrated with sodium thiosulfate in an acidic condition with sulfuric acid under the presence of potassium iodide.

Activity

The capability of forming 10 mg of glucose in 30 minutes under the condition of pH 4.5 and 30° C.±1° C. is defined as one unit.

(Pectinase Activity)

Enzyme acts on pectine as the substrate and the reduction in the viscosity is measured by a viscometer.

Activity

Capability of reducing viscosity to 50% in one minute under the condition of pH 4.5 and 30° C.±1° C. is defined as 1 unit.

(Protease Activity)

Enzyme acts on milk casein as the substrate, undigested casein is removed by settling with trichloroacetic acid solution, the soluble decomposition products are caused to develop color with an alkaline Folin's reagent and absorption at 660 nm was measured to quantitatively determine the activity.

Activity

Quantity of enzyme corresponding to form 1 umole of tyrosine for 60 minutes is defined as one unit.

The present invention is advantageous in providing a high quality and stable vinegar excellent in view of sensory property at a low price since the soluble nitrogen content of vinegar can be controlled with ease by deactivating protease and by further adding pectinase preparation when using rice as the starting material and fermentation can be attained at good yield with no protease activity in the case of corn and, further, by controlling the enzyme blending amount and temperature. It is not apparent at present why the amount of glucoamylase and pectinase preparation used and the ratio between both of the enzymes in the present invention can effectively influence the saccharification of raw starch material and alcoholic fermentation. However, it is apparent that each of enzymes used in the amount according to the present invention effectively contributes to the saccharification of raw starch in view of the high alcoholic fermentation yield. Further, the soluble solid content in the fermentation liquid is always reduced as compared with the conventional method and, accordingly, the amount of lactic acid and glycerine produced is low.

EXAMPLES

Example 1

After pulverizing 1 kg of rice, 2.7 liter of water, 9000 units of commercially available glucoamylase preparation subjected to alkali treatment by the applicant and 130 units of purified pectinase not containing protease activity were added and, after adjusting pH to 4.5 with fumaric acid, 4 g of home cultured yeast was added to conduct alcoholic fermentation at 28° C. for four days, to obtain 3.3 liter of MOROMI at 14.5% alcohol concentration and 135 mg/100 ml of soluble nitrogen content. Then, 0.68 liter of seed vinegar (acidity 8.0%) and 1.72 liter of water were added and, subjected to solid-liquid separation, filtered and purified to obtain 5.4 liter of separated liquid at 1.0% acidity and 8.0% alcohol concentration. The separated liquid was added gradually to one liter of seed vinegar (8.0% acidity, 1% alcohol concentration) containing active acetobacter cultured by previous aeration fermentation in a fermentation device, to conduct acetic acid fermentation. Finally, 6.4 liter of fermentation liquid at 8.8% acidity was obtained. After filtering and purifying the fermentation liquid, the acidity was adjusted to 4.5% to obtain vinegar with good flavor containing 40 mg/100 ml of soluble nitrogen.

Example 2

After pulverizing 1 kg of rice, 2.7 liter of water, 9000 units of commercially available glucoamylase preparation and 130 units of commercially available pectinase preparation were added and, after adjusting pH to 4.5 with fumaric acid, 3 g of living bread yeast was added to conduct alcoholic fermentation at 28° C. for four days, to obtain 3.3 liter of MOROMI at 15.6% alcohol concentration and 200 mg/100 ml of soluble nitrogen content. Then, 0.75 liter of seed vinegar (acidity 8.0%) and 2.1 liter of water were added and, subjected to solid-liquid separation, filtered and purified to obtain 5.85 liter of separated liquid at 1.0% acidity and 8.0% alcohol concentration. Subsequently, acetic acid fermentation was conducted in the same way as in Example 1 to obtain 6.85 liter of fermentation liquid at 8.8% acidity. After filtering and purifying the fermentation liquid, the acidity was adjusted to 4.5% to obtain vinegar with good flavor containing 67 mg/100 ml of soluble nitrogen.

Example 3

After pulverizing 1 kg of rice, 2.7 liter of water, 14000 units of commercially available glucoamylase preparation and 200 units of commercially available pectinase preparation were added and, after adjusting pH to 4.5 with fumaric acid, 3 g of living bread yeast was added to conduct alcoholic fermentation at 34° C. for two days, to obtain 3.6 liter of MOROMI at 14.3% alcohol concentration and 260 mg/100 ml of soluble nitrogen content. Then, 0.74 liter of seed vinegar (acidity 8.0%) and 1.1 liter of water were added and, subjected to solid-liquid separation, filtered and purified to obtain 5.9 liter of separated liquid at 1.0% acidity and 8.0% alcohol concentration. Subsequently, acetic acid fermentation was conducted in the same way as in Example 1 to obtain 6.9 liter of fermentation liquid at 8.9% acidity. After filtering and purifying the fermentation liquid, the acidity was adjusted to 4.5% to obtain vinegar with enriched taste containing 95 mg/100 ml of soluble nitrogen.

Example 4

After pulverizing 1 kg of corn, 2.7 liter of water, 10000 units of commercially available glucoamylase preparation were added and, after adjusting pH to 4.5 with fumaric acid, 4.5 g of home cultured yeast was added to conduct alcoholic fermentation at 28° C. for four days, to obtain 3.3 liter of MOROMI at 12.6% alcohol concentration and 53 mg/1000 ml of soluble nitrogen content. Then, 0.6 liter of seed vinegar (acidity 8.0%) and 1.1 liter of water were added and, subjected to solid-liquid separation, filtered and purified to obtain 4.7 liter of separated liquid at 1.0% acidity and 8.0% alcohol concentration. Subsequently, acetic acid fermentation was conducted in the same way as in Example 1 to obtain 5.7 liter of fermentation liquid at 8.9% acidity. After filtering and purifying the fermentation liquid, the acidity was adjusted to 4.5% to obtain vinegar with good flavor containing 20 mg/100 ml of soluble nitrogen.

Example 5

After pulverizing 1 kg of corn, 2.7 liter of water, 10000 units of commercially available glucoamylase preparation and 130 units of commercially available pectinase preparation were added and, after adjusting pH to 4.5 with fumaric acid, 3 g of living bread yeast was added to conduct alcoholic fermentation at 28° C. for four days, to obtain 3.3 liter of MOROMI at 12.7% alcohol concentration and 70 mg/100 ml of soluble nitrogen content. Then, 0.6 liter of seed vinegar (acidity 8.0%) and 1.2 liter of water were added, denatured, subjected to solid-liquid separation, filtered and purified to obtain 4.8 liter of separated liquid at 1.0% acidity and 8.0% alcohol concentration. Subsequently, acetic acid fermentation was conducted in the same way as in Example 1 to obtain 5.8 liter of fermentation liquid at 8.9% acidity. After filtering and purifying the fermentation liquid, the acidity was adjusted to 4.5% to obtain vinegar with good flavor containing 23 mg/100 ml of soluble nitrogen.

Example 6

After pulverizing 1 kg of corn, 3 liter of water, 15000 units of commercially available glucoamylase preparation and 230 units of commercially available pectinase preparation were added and, after adjusting pH to 4.5 with fumaric acid, 3 g of living bread yeast was added to conduct alcoholic fermentation at 32° C. for four days, to obtain 3.6 liter of MOROMI at 12.1% alcohol concentration and 145 mg/100 ml of soluble nitrogen content. Then, 0.63 liter of seed vinegar (acidity 8.0%) and 1.07 liter of water were added, denatured, subjected to solid-liquid separation, filtered and purified to obtain 5.0 liter of separated liquid at 1.0% acidity and 8.0% alcohol concentration. Subsequently, acetic acid fermentation was conducted in the same way as in Example 1 to obtain 6.0 liter of fermentation liquid at 8.9% acidity. After filtering and purifying the fermentation liquid, the acidity was adjusted to 4.5% to obtain vinegar with enriched taste containing 50 mg/100 ml of soluble nitrogen.

Example 7

After pulverizing 1 kg of rice, 3 liter of water, 10000 units of commercially available glucoamylase preparation and 130 units of commercially available pectinase preparation were added and, after adjusting pH to 4.5 with fumaric acid, 3 g of living bread yeast was added to conduct alcoholic fermentation at 34° C. for 24 hours and temperature was lowered to 28° C. to conduct alcoholic fermentation for two days, to obtain 3.6 liter of MOROMI at 14.5% alcohol concentration and 150 mg/100 ml of soluble nitrogen content. Then, 1.25 liter of seed vinegar (acidity 10.0%) and 0.45 liter of water were added, subjected to solid-liquid separation, filtered and purified to obtain 5.0 liter of separated liquid at 2.5% acidity and 9.5% alcohol concentration. The separated liquid was added gradually to one liter of seed vinegar (10% acidity, 2% alcohol concentration) containing active acetobacter cultured by previous aeration fermentation in a fermentation device to conduct acetic acid fermentation. Finally, 6.0 liter of fermentation liquid at 11.7% acidity was obtained. After filtering and purifying the fermentation liquid, the acidity was adjusted to 4.5% to obtain vinegar with enriched taste containing 42 mg/100 ml of soluble nitrogen.

Example 8

After pulverizing 1 kg of corn, 2.7 liter of water, 11000 units of commercially available glucoamylase preparation and 150 units of commercially available pectinase preparation were added and, after adjusting pH to 4.5 with fumaric acid, 3 g of living bread yeast was added and kept at 34° C. for 24 hours from the charging followed by alcoholic fermentation at 28° C. for two days, to obtain 3.3 liter of MOROMI at 13.2% alcohol concentration and 43 mg/100 ml of soluble nitrogen content. Then, 1.05 liter of seed vinegar (acidity 10.0%) and 0.15 liter of water were added, denatured, subjected to solid-liquid separation, filtered and purified to obtain 4.2 liter of separated liquid at 2.5% acidity and 9.5% alcohol concentration. Subsequently, acetic acid fermentation was conducted in the same way as in Example 7 to obtain 5.2 liter of fermentation liquid at 11.7% acidity. After filtering and purifying the fermentation liquid, the acidity was adjusted to 4.5% to obtain vinegar with enriched taste containing 14 mg/100 ml of soluble nitrogen.

What is claimed is:

1. A process for producing vinegar from non-cooked alcohol MOROMI derived from corn, which comprises:
   pulverizing corn which has not undergone heat denaturation,
   adding water in an amount from 2.0 to 7.0 times by volume to the pulverized corn, then adding a glucoamylase preparation containing from 8 to 15 units of glucoamylase activity per 1 gram of starch in the pulverized corn and from 0 to 35 units of protease activity per 1 gram of starch in the pulverized corn and yeast to the pulverized corn,
   conducting alcoholic fermentation of raw starch material in the pulverized corn,
   separating the resultant solid content from the resultant liquid solution containing alcohol, and
   conducting acetic acid fermentation of the separated liquid solution by means of acetic acid bacteria,
   wherein said process is conducted in the absence of malt.

2. A process according to claim 1, wherein the mixture resulting from the fermentation contains glycerine in an amount from 2.0 g to 3.0 g/100 g.

3. A process according to claim 1, wherein the fermentation with acetic acid bacteria is conducted so as to provide an initial acid concentration of 2–8% and an initial alcohol concentration of 0.4–4% under aeration in an amount of from 0.04 to 0.20 liter of air/min/liter of MOROMI.

* * * * *